United States Patent
Mao et al.

(10) Patent No.: US 10,019,582 B1
(45) Date of Patent: Jul. 10, 2018

(54) DETECTING APPLICATION LEAKS

(71) Applicant: Symantec Corporation, Mountain View, CA (US)

(72) Inventors: Jun Mao, Torrance, CA (US); Jingnan Si, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 15/052,717

(22) Filed: Feb. 24, 2016

(51) Int. Cl.
  *G06F 21/55* (2013.01)
  *G06F 21/60* (2013.01)
  *H04L 12/14* (2006.01)

(52) U.S. Cl.
  CPC ............ *G06F 21/60* (2013.01); *G06F 21/556* (2013.01); *H04L 12/1435* (2013.01); *G06F 21/55* (2013.01)

(58) Field of Classification Search
  CPC .... G06F 21/556; G06F 21/60; G06F 21/6218; G06F 21/62; G06F 21/6209; G06F 21/50; G06F 21/554
  See application file for complete search history.

(56) References Cited

U.S. PATENT DOCUMENTS

| | | | | |
|---|---|---|---|---|
| 8,321,940 B1 * | 11/2012 | Pereira | ............ | G06F 21/00 726/23 |
| 9,349,015 B1 * | 5/2016 | Archer | ............ | G06F 21/60 |
| 2012/0137375 A1 * | 5/2012 | Ramachandran | ... | G06F 21/6218 726/28 |
| 2013/0024944 A1 * | 1/2013 | Sasaki | ............ | G06F 21/556 726/27 |
| 2013/0276108 A1 * | 10/2013 | Blackwell | ............ | G06F 21/552 726/22 |
| 2014/0007184 A1 * | 1/2014 | Porras | ............ | G06F 21/53 726/1 |
| 2017/0068812 A1 * | 3/2017 | Zhai | ............ | G06F 21/62 |
| 2017/0091482 A1 * | 3/2017 | Sarin | ............ | G06F 21/6245 |
| 2017/0206377 A1 * | 7/2017 | Wyatt | ............ | G06F 21/6245 |

OTHER PUBLICATIONS

D. Sb^irlea et al., "Automatic detection of inter-application permission leaks in Andriod applications", Nov./Dec. 2013, IBM Journal of Research and Development, vol. 57, No. 6., Paper 10, pp. 1-12.*

(Continued)

*Primary Examiner* — Nelson Giddins
(74) *Attorney, Agent, or Firm* — Holland & Hart LLP

(57) ABSTRACT

A method for detecting application leaks is described. In one embodiment, the method may include the method may include identifying a first application as a known application, assigning a first identifier to the first application, appending the first identifier to data generated by the first application, identifying a second application as an unknown application, assigning a second identifier to the second application, identifying a data usage by the second application, appending the second identifier to data associated with the data usage by the second application, and determining whether the data usage by the second application is associated with the data generated by the first application based at least in part on the first identifier and the second identifier. In some cases, the data usage includes at least one of generating data, modifying data, and transmitting data.

20 Claims, 7 Drawing Sheets

(56) References Cited

OTHER PUBLICATIONS

D. Sb^irlea et al., "Automatic detection of inter-application permission leaks in Andriod applications", Nov./Dec. 2013, IBM Journal of Research and Development, vol. 57, No. 6., Paper 10, pp. 1-12.*

Chin, et al., "Analyzing inter-application communication in Android", Jun. 28, 2011-Jul. 1, 2011, MobiSys '11 Proceedings of the 9th international conference on Mobile systems, applications, and services, pp. 239-252.*

D. Sb^irlea et al., "Automatic detection of inter-application permission leaks in Andriod applications", Nov./Dec. 2013, IBM Journal of Research and Development, vol. 57, No. 6., Paper 10, pp. 1-12.*

Hay et al., "Dynamic Detection of Inter-application Communication Vulnerabilities in Android", Jul. 13-17, 2015, ISSTA 2015 Proceesings of the 2015 International Symposium on Software Testing and Analysis, pp. 118-128.*

* cited by examiner

DETECTING APPLICATION LEAKS

BACKGROUND

Advancements in media delivery systems and data-related technologies continue to increase at a rapid pace. Increasing demand for accessible data has influenced the advances made to data-related technologies. Computer systems have increasingly become an integral part of data creation, data usage, and data storage. Computer systems may be used to carry out several data-related functions. The wide-spread access to data has been accelerated by the increased use of computer networks, including the Internet and cloud networking.

Many homes and businesses use one or more computer networks to generate, deliver, and receive data and information between the various computers coupled with computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of and continued advancements in developing security software products. For example, advancements in security software products associated with mobile devices allow users to protect sensitive data on the mobile devices. Nevertheless, benefits may be realized by providing techniques for improving security software products.

SUMMARY

According to at least one embodiment, a method for detecting application leaks is described. In one embodiment, the method may include identifying a first application as a known application, assigning a first identifier to the first application, and appending the first identifier to data generated by the first application. The method may also include identifying a second application as an unknown application, assigning a second identifier to the second application, identifying a data usage by the second application, appending the second identifier to data associated with the data usage by the second application, and determining whether the data usage by the second application is associated with the data generated by the first application based at least in part on the first identifier and the second identifier. In some cases, the data usage includes at least one of generating data, modifying data, and transmitting data.

In some embodiments, the method may include searching the data associated with the data usage by the second application for one or more identifiers assigned to one or more applications other than the second application. Upon identifying based at least in part on the search the first identifier in the data associated with the data usage by the second application, the method may include categorizing the second application as a leaking application.

In one embodiment, the method may include generating a notification. In some cases, the notification may indicate that the second application is a leaking application. In one embodiment, the method may include identifying, in the data associated with the data usage by the second application, two or more identifiers assigned to two or more applications other than the second application. The method may include generating a leak map based at least in part on the identifying of the two or more identifiers assigned to the two or more applications other than the second application.

In some cases, the leak map includes a flow of the data associated with the data usage by the second application from an originating application to one or more intervening and from the one or more intervening applications to the second application, the two or more identifiers being associated with the originating application and the one or more intervening applications, and wherein information related to the leak map is provided in a message to a user of the first application.

A computing device configured for detecting application leaks is additionally described. The computing device may include a processor and memory in electronic communication with the processor. The memory may store computer executable instructions that when executed by the processor cause the processor to perform the steps of identifying a first application as a known application, assigning a first identifier to the first application, and appending the first identifier to data generated by the first application. The instructions executed by the processor may cause to processor to perform the steps of identifying a second application as an unknown application, assigning a second identifier to the second application, identifying a data usage by the second application, appending the second identifier to data associated with the data usage by the second application, and determining whether the data usage by the second application is associated with the data generated by the first application based at least in part on the first identifier and the second identifier.

A non-transitory computer-readable storage medium storing computer executable instructions is additionally described. When the instructions are executed by a processor, the execution of the instructions may cause the processor to perform the steps of identifying a first application as a known application, assigning a first identifier to the first application, and appending the first identifier to data generated by the first application. The instructions executed by the processor may cause to processor to perform the steps of identifying a second application as an unknown application, assigning a second identifier to the second application, identifying a data usage by the second application, appending the second identifier to data associated with the data usage by the second application, and determining whether the data usage by the second application is associated with the data generated by the first application based at least in part on the first identifier and the second identifier.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
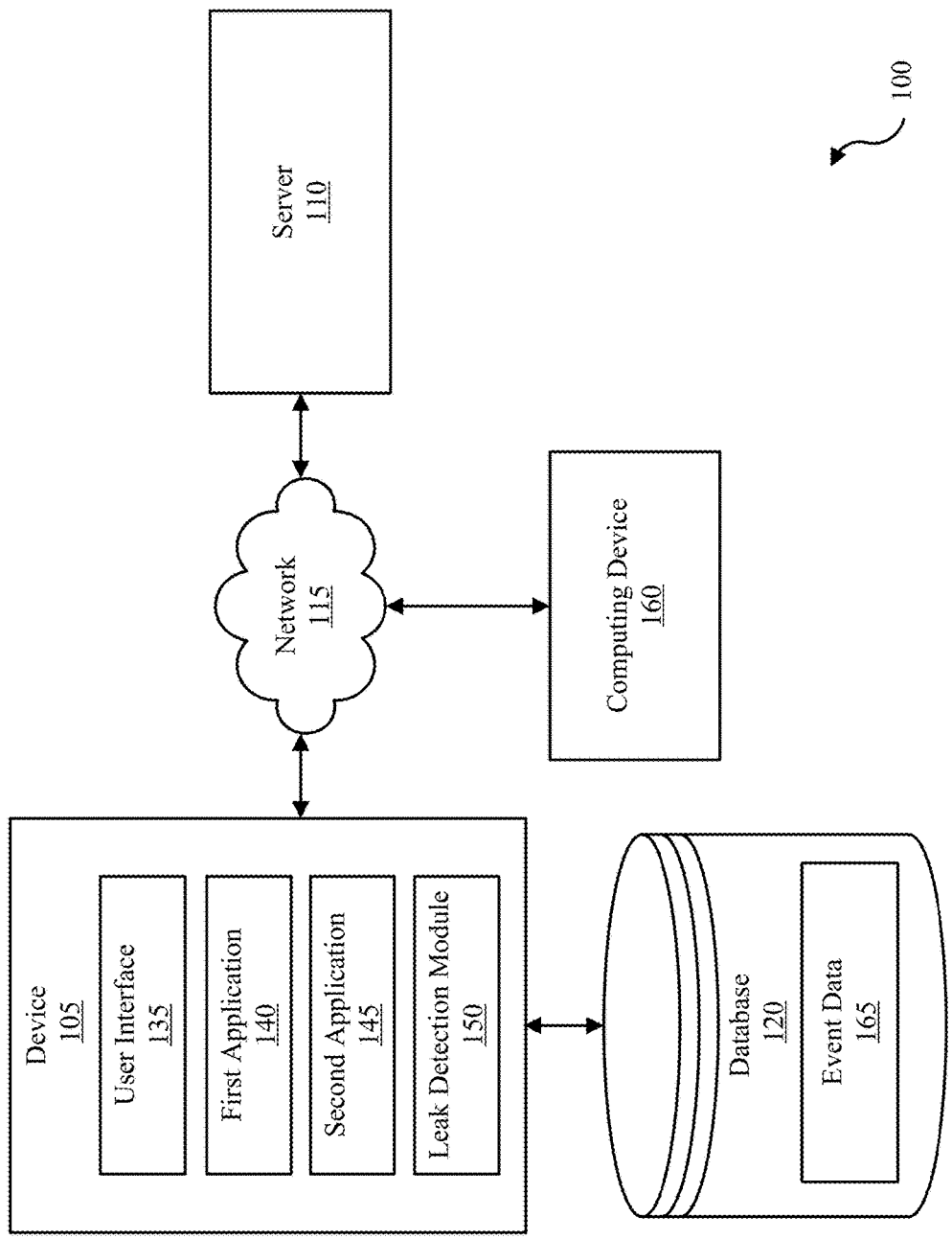
FIG. 1 is a block diagram illustrating one embodiment of an environment in which the present techniques may be implemented, in accordance with various aspects of this disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The techniques described herein relate to detecting application leaks. More specifically, the techniques described herein relate to detecting application leaks via dynamic analysis of the behavior of applications installed on an android system. Advancements in mobile device malware continues to increase at a startling rate. Malware on device platforms (e.g., mobile device Android platforms) continuously attempt to leak user information. Presently, users of devices, for example, mobile devices based on ANDROID® operating system have limited capabilities of protecting sensitive private data. The present techniques describe detecting and preventing data leaks from an ANDROID® device, or any other type of operating system running on the device.

FIG. 1 is a block diagram illustrating one embodiment of an environment 100 in which the present techniques may be implemented. In some embodiments, the techniques described herein may be performed on a device (e.g., device 105). As depicted, the environment 100 may include a device 105, server 110, a computing device 160, and a network 115 that allows the device 105, the server 110, and the computing device 160 to communicate with one another.

Examples of the device 105 may include any combination of mobile devices, smart phones, personal computing devices, computers, laptops, desktops, servers, media content set top boxes, etc. Examples of computing device 160 may include any combination of a mobile computing device, a laptop, a desktop, a server, a media set top box, etc. Examples of server 110 may include any combination of a data server, a cloud server, a server associated with an automation service provider, proxy server, mail server, web server, application server, database server, communications server, file server, home server, mobile server, name server, etc.

In some configurations, the device 105 may include a user interface 135, a first application 140, a second application 145, and a leak detection module 150. Although the components of the device 105 are depicted as being internal to the device 105, it is understood that one or more of the components may be external to the device 105 and connect to device 105 through wired and/or wireless connections. In some embodiments, a first application 140 and/or second application 145 may be installed on computing device 160 in order to allow a user to interface with a function of device 105, leak detection module 150, and/or server 110. Alternatively, while only two applications (e.g., first application 140 and second application 145) are illustrated, the environment 100 may include any number of applications available to the device 105.

In some embodiments, device 105 may communicate with server 110 via network 115. Examples of network 115 may include any combination of cloud networks, local area networks (LAN), wide area networks (WAN), virtual private networks (VPN), wireless networks (using 802.11, for example), cellular networks (using 3G and/or LTE, for example), etc. In further embodiments, the network 115 may include the Internet. It is noted that in some embodiments, the device 105 may not include a leak detection module 150. In some embodiments, device 105 and server 110 may include a leak detection module 150 where at least a portion of the functions of leak detection module 150 are performed separately and/or concurrently on device 105 and/or server 110. Likewise, in some embodiments, a user may access the functions of device 105 (directly or through device 105 via leak detection module 150) from computing device 160. For example, in some embodiments, computing device 160 includes a mobile application that interfaces with one or more functions of device 105, leak detection module 150, and/or server 110.

As depicted, database 120 may be associated with device 105. Although depicted external to device 105, in some embodiments, database 120 may be internal to device 105. In some embodiments, server 110 may be coupled to a database (e.g., database 120). Database 120 may be internal or external to the server 110. In some embodiments database 120 stores data and information associated with one or more rules for generating a notification indicating an application as a leaking application. For example, the database 120 stores one or more of a rule, a notification type based rule, etc. In some embodiments, the database 120 stores data and information of each user of a device and/or an application. In further embodiments, the database 120 may include event data 165. For example, device 105 may access event data 160 in database 120 over network 115 via server 110. Event data 160 may include information associated with a user of the application and/or data of the application (e.g., sensitive data, private data, etc.). In some embodiments, the event data may include information associated with an action, timestamp and state of an application. For instance, in one embodiment, a user accessing a first application 140 on device 105 may request to publish data. For example, a user of device 105 may access a social networking application (e.g., first application 140) and request to publish a post on a news feed of the social networking application. In some embodiments, the first application 140 may include an identifier identifying the application as a first application (e.g., a first social networking application), a timestamp associated with the first application, and a state associated with user information (e.g., identity of a user accessing the first application 140).

In some embodiments, an identifier of an application may include security trustworthiness information associated with the application, as described elsewhere herein. Additionally, responsive to the first application 140 generating data (e.g., post, e-mail, blog, document, text message, etc.) in some embodiments, may include appending the identifier to the data generated by the first application 140. The data (i.e., event data) and the identifier may be stored in the database 120. In some embodiments, one or more components of environment 100 may monitor event data 165 stored in the database 120. Monitoring event data 165 may include, monitoring whether one or more unknown applications request event data associated with the first application. In some embodiments, monitoring event data 165 may include monitoring whether one or more unknown applications modify and transmit the event data to one or more additional applications, as discussed elsewhere herein.

Leak detection module 150 may enable a first application 140 to identify a second application 145 as a leaking application based at least in part on a data usage associated with the first application 145 and the second application 145, and one or more identifiers of the data usage. In some embodiments, leak detection module 150 may be configured to perform the techniques described herein in conjunction with server 110, user interface 135, and computing device 160. Additional details regarding the leak detection module 150 are discussed below.

Figure 2:
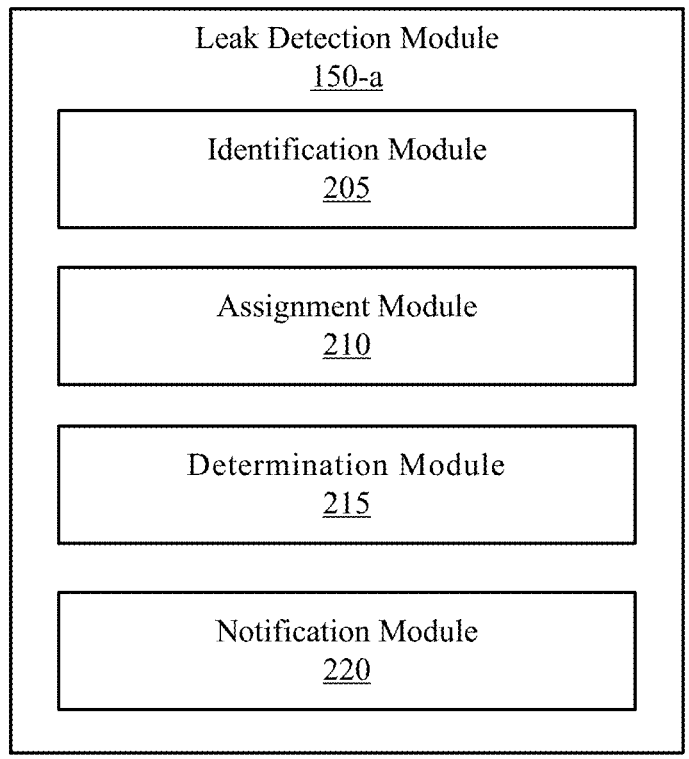
FIG. 2 is a block diagram illustrating one example of a leak detection module, in accordance with various aspects of this disclosure.

FIG. 2 is a block diagram illustrating one example of a leak detection module 150-*a*. Leak detection module 150-*a* may be one example of leak detection module 150 depicted in FIG. 1. As depicted, leak detection module 150-*a* may include an identification module 205, an assignment module 210, a determination module 215, and a notification module 220.

The leak detection module 150-*a* may be configured to prevent event data leakage from a first application to a second application. In one embodiment, a first application (e.g., first application 140 of FIG. 1) may be installed on an operating system of a mobile computing device. In one embodiment, the identification module 205 may identify the first application as a known application. A known application may include, but is not limited to, an application associated with a trusted source. In some cases, an application may be verified by a standardized application verification process such as identifying a signed digital certificate provided by the application. Additionally, or alternatively, an application may be verified based on a monitoring of the application. For example, the leak detection module 150-*a* may monitor an application to determine whether the application performs any suspicious actions such as attempts to access data associated with a different application, attempts to access sensitive data associated with the operating system, and so on. After a period of monitoring where no suspicious activity is identified, the leak detection module 150-*a* may categorize the application as a known application and/or a trusted application. As another example, a user of device 105 may install a financial application in association with a bank of the user. The financial application may include a method to request a user of the device 105 for information associated with the account of the user. Information requested by an application (e.g., the financial application) may include, but is not limited to, an account number, first name, last name, residential address, employer information, security questions/answers, etc. In one embodiment the information requested by the application (e.g., first application 140) and provided by the user via device 105 may be stored as event data 165 in database 120.

In some embodiments, the assignment module 210 may assign an identifier to an application. In one embodiment, an identifier may be part of one or more fields in a data frame. The one or more fields of the data frame may include information such as, but not limited to, a description field, publisher field, date field, type filed, format field, identifier field, and/or source field. In some embodiments, assignment module 210 may assign a first identifier to a first application (e.g., first application 140). An identifier field of the data frame, in some embodiments, may include the first identifier identifying information associated with the first application, such as, but not limited to, an application-ID and an application type. In some cases, the application-ID may be a unique identifier (e.g., a globally unique identifier (GUID)). In an example, the first application 140 may be identified as a financial application based at least in part on the application-ID and application type in the first identifier. In some embodiments, an assignment module 210 may assign and/or append an identifier to a new and/or existing file of an application. For example, a word processing application (e.g., Microsoft Word) may have an identifier pre-assigned, a user of the word processing application open a file associated with the word processing application and modify and/or update contents of the file. Responsive to the update of the file, the assignment module 210 may append and/or modify the pre-assigned identifier to reflect the identity of the application that originated the data and/or to identify the modification and/or update.

In some embodiments, the assignment module 210 may append a preassigned identifier (e.g., first identifier) to data generated by an application (e.g., first application 140). For instance, a user of the first application 140 may generate and/or modify previously generated data (e.g., personnel information, employer information, etc.) in the application, the assignment module 210 may append a preassigned identifier of the application based at least in part on the generation and/or modification of the data. In some embodiments, data associated with the application (e.g., first application 140) may be generated and/or modified at a server-side 110, and transmitted automatically by the server 110 to the first application 140 on device 105. For instance, in the example above, the financial application on device 105 may automatically update event data in the financial application based at least in part on data generated at the bank (e.g., bank account information updated, etc.) server-side. In some embodiments, the first application 140 may send data to an external device such as server 110. Upon sending the data to the external device, the assignment module 210 may append an identifier to the data being sent.

In one embodiment, the identification module 205 may identify a second application (e.g., second application 145) as an unknown application. An unknown application may include, but is not limited to, an application associated with an unknown and/or untrusted source. In some embodiments, the second application 145 may be a newly installed application not previously monitored or verified by leak detection module 150-*a*. Accordingly, leak detection module 150-*a* may monitor second application 145 for a predetermined period of time to determine whether second application 145 may be trusted. If no suspicious activity is detected, leak detection module 150-*a* may categorize second application 145 as a known application and/or a trusted application.

In one embodiment, the assignment module 210 may assign an identifier to the second application. In some embodiments, assignment module 210 may assign a second identifier to a second application (e.g., second application 145). An identifier field of a data frame, in some embodiments, may include the second identifier identifying information associated with the second application, such as, but not limited to, an application-ID, application source, and/or application type. For example, the second application 145 may be identified as an unknown application based at least in part on the application-ID, application source, and/or application type included in the second identifier.

In some embodiments, the identification module 205 in communication with the assignment module 210 may identify a data usage by the second application (e.g., second application 145). In one embodiment, a data usage may include, but is not limited to, generating data, modifying data, and transmitting data by one or more applications. In some embodiments, a data usage by a second application may include, but is not limited to, a system feature request. The system feature request, in some embodiments, may include request for event data and/or a type of event data (e.g., private sensitive data) associated with contacts of a user, a GPS location of a user, accounts information, etc., from one or more applications (e.g., first application 140) and/or an operating system or system service on device 105.

In some embodiments, the assignment module 210 may append the second identifier to data associated with the data usage by the second application 145. For instance, the second application 145 may request for accounts information from the first application 140. In one embodiment, the first application 140 transmits the accounts information to the second application 145. In some cases, the second application 145 may intercept data generated, modified, and/or transmitted by the first application. In some embodiments, the determination module 215 determines a type of data requested by the second application 145 and the leak detection module 150-a generates incorrect identifiable information based at least in part on the type of data requested. For example, in some embodiments, upon identifying the second application 145 accessing or intercepting data from the first application 140, the leak detection module 150-a transmits incorrect/fake accounts information to the second application 145. Since the first application 140 transmitted event data of the same type requested by the second application 145, the second application 145 may presume that the accounts information received from the leak detection module 150-a is correct. In one embodiment, the assignment module 210 may append the second identifier of the second application 145 to the data associated with the data usage.

In one embodiment, the determination module 215 may determine whether the data usage by the second application 145 is associated with the data generated by the first application 140 based at least in part on the first identifier and the second identifier. For instance, determination module 215 may determine that event data (e.g., accounts information) in a data usage of the second application 145 is associated with data (e.g., accounts information,) generated by the first application 140 based at least in part on each of the identifiers assigned to the data (e.g., event data 165). For example, the data from the data usage by the second application 145 may be data generated, modified, and/or transmitted originally by the first application 140. The first identifier associated with the first application 140 may have previously been appended to this data. Thus, when the second application 145 accesses the data from the first application 140, the first identifier may be already appended to this data. When the second application 145 accesses this data, the second identifier may be appended to the data indicating that the second application has accessed this data. Accordingly, with identifiers from both application on the data, leak detection module 150-a may determine that the second application is attempting to leak data from the first application.

In some embodiments, the second application 145 may infiltrate the system contacts application via the first application 140. For example, the first application 140 may be a trusted application. The first application 140 may have access to a system contacts application, system email application, system messaging application, etc. The second application 145 may access the system application (e.g., system contacts application, system email application, system messaging application, etc.) via an unauthorized access of first application 140. Thus, the data being accessed by the second application 145 may originate with a system application. Thus, the accessed data may have an identifier associated with the system application. Additionally, in some embodiments, the accessed data may have an identifier from the first application 140 as well. When the second application 145 accesses this data (e.g., a data usage by the second application 145), assignment module 210 may append the second identifier associated with the second application 145 to the accessed data. Thus, in some cases, the accessed data may include identifiers from the system application, first application 140, and second application 145.

In some embodiments, upon identifying the second application 145 performing a data operation (e.g., a data usage associated with data from the first application 140), the determination module 215 may search the data associated with the data usage by the second application 145 for one or more identifiers assigned to one or more applications other than the second application 145. As one example, first application 140 may create contact A. The leak detection module 150-a may append first identifier ABC123 to contact A. The second application 145 accesses contact A (e.g., reads contact A, tries to send it, etc.). The leak detection module 150-a detects the access or data usage by the second application 145. The leak detection module 150-a appends the second identifier XYZ789 associated with second application 145 to contact A accessed by the second application. In some cases, the contact A access by the second application may be a copy of contact A. Alternatively, it may be the original contact A. In either case, the original and/or copy of contact A has the first identifier ABC123 appended to it. The leak detection module 150-a may search contact A from the second application 145 data usage for application identifiers. The application identifiers may be appended to the data of contact A and/or the metadata of contact A. Based on this search, leak detection module 150-a may determine that both identifiers ABC123 and XYZ789 are appended to contact A. Leak detection module 150-a may determine that the first application 140 originated contact A based on the order in which ABC123 is appended to contact A, such as based on a predefined system of appending identifiers in a predetermined order. Additionally, leak detection module 150-a may determine that ABC123 is from a known/trusted application and XYZ789 from an unknown application. Thus, leak detection module 150-a may determine that the first application 140 generated contact A and the second application 145 is attempting to leak contact A. Accordingly, leak detection module 150-a may categorize second application 145 as a leaking application.

In one embodiment, the determination module 215 may identify in the data associated with the data usage by the second application 145, two or more identifiers assigned to two or more applications other than the second application 145 based at least in part on parsing of the database 120. In some embodiments, upon identifying based at least in part on the searching, the first identifier in the data associated with the data usage by the second application 145, the determination module 215 may categorize the second application 145 as a leaking application.

The determination module 215, in some embodiments, may generate a leak map based at least in part on identifying the two or more identifiers assigned to the two or more applications other than the second application 145. In some embodiments, the determination module may determine one or more additional/other applications as leaking applications based at least in part on the leak map. A leak map, for example, may include, but is not limited to, a flow of the data associated with the data usage by the second application 145 from an originating application (e.g., first application 140) to one or more intervening and from the one or more intervening applications to the second application 145. In some embodiments, the determination module 215 may associated the two or more identifiers with the originating application and the one or more intervening applications. For example, identifiers appended to the data may be appended in a specified order such as the originating application being the first identifier, the next identifier being the second application to access this data, and so forth. In some cases, the determination module 215 may determine that the first identifier appended to the data is from a trusted application and that the second identifier appended to the data after the first identifier is from an untrusted application. Accordingly, because the second identifier is added due to a usage of the data by an unknown second application 145, the second application 145 may be categorized as an untrusted or leaking application.

In one embodiment, the notification module 220 may generate a notification. A notification, in some embodiments may include, but is not limited to, an SMS message, e-mail, window pop-up on a device, an alert telephone voicemail/call, push notification, etc., transmitted to a device. For instance, a device 105 may receive a notification SMS message and/or push notification message indicating that an application (e.g., second application 145) installed on device 105 is a potential leaking application. In one embodiment, the notification module 220 may generate a notification including information related to a leak map in a message to a user of the first application (e.g., first application 140).

In some embodiments, the notification provided to a device of the user may be based at least in part on a notification type rule elected by a user via settings. For instance, a user of an application may select in a notification settings of the application a type of notification to be transmitted as an alert.

Figure 3:
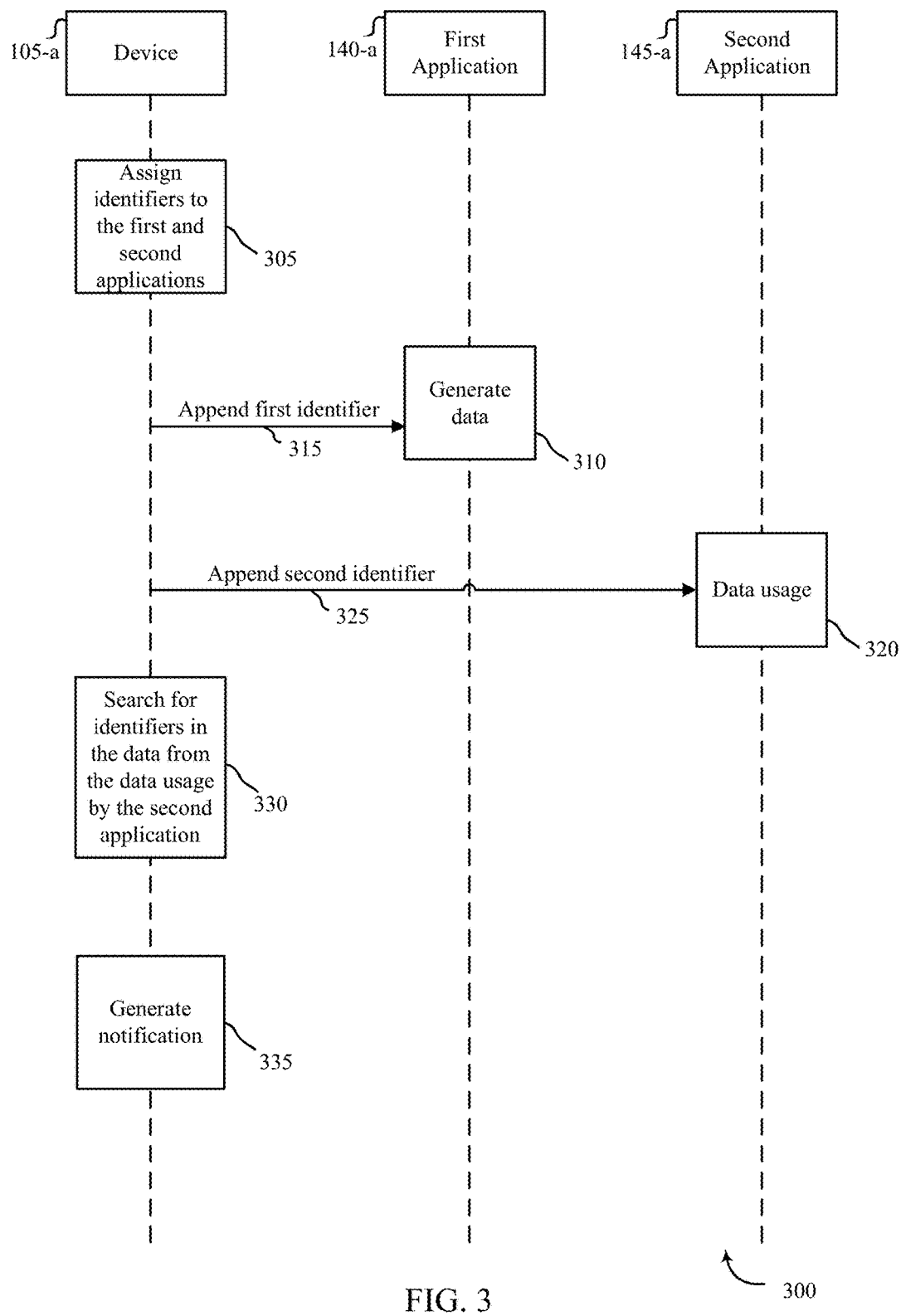
FIG. 3 shows a block diagram of a data flow relating to detecting application leaks, in accordance with various aspects of this disclosure.

FIG. 3 shows a block diagram of a data flow 300 relating to detecting application leaks, in accordance with various aspects of this disclosure. The data flow 300 illustrates the flow of data between device 105-a, a first application 140-a, and a second application 145-a. The device 105-a may be an example of one or more aspects of device 105 from FIG. 1. The first application 140-a and the second application 145-a may be examples of one or more aspects of the first application 140 and the second application 145 of FIG. 1. In some cases, device 105-a may include a storage device and/or database (e.g., database 120).

By way of example, the data flow may begin at block 305. At block 305, the device 105-a assigns identifiers to the first application 140-a and the second application 145-a. For example, device 105-a may assign a first identifier to first application 140-a and a second identifier to second application 145-a. At block 310, the first application 140-a generates data. Responsive to the first application 140-a generating the data, at 315 the device 105-a may append the first identifier of the first application 140-a to the data generated by the first application 140-a. In some cases, device 105-a may include a leak detection module (e.g., leak detection module 150 of FIGS. 1 and/or 2). In conjunction with the leak detection module 150, device 105-a may identify first application 140-a performing a data operation such as generating data, modifying data, and/or transmitting data, etc. Accordingly, device 105-a may identify the generation of data at block 310 and append the first identifier to the generated data. For example, device 105-a may append the first identifier at the beginning, middle, or end of the data. In some cases, device 105-a may append the first identifier to metadata of the generated data.

At block 320, the second application 145-a may perform data usage. Accordingly, device 105-a may identify the data usage by the second application 145-a. Thus, responsive to the second application 145-a performing data usage, at 325 the device 105-a may append the second identifier of the second application 145-a to the data from the data usage.

At block 330, the device 105-a may perform a search on the data from the data usage by the second application 145-a. For example, device 105-a may search for each identifier appended to the data from the data usage. If only the second identifier from the second application 145-a is found from this search, then the device 105-a may determine that the data originated from the second application 145-a. However, if an identifier from another application is found appended to the data in addition to the second application 145-a, the device 105-a may determine that the second application 145-a leaks data from at least the other application. Accordingly, upon determining the data from the data usage by the second application 145-a includes at least one identifier from another application (e.g., first application 140-a, etc.), device 105-a may categorize the second application 145-a as a leaking application and at block 335, the device 105-a may generate a notification indicating the second application 145-a has attempted to leak information from another application.

Figure 4:
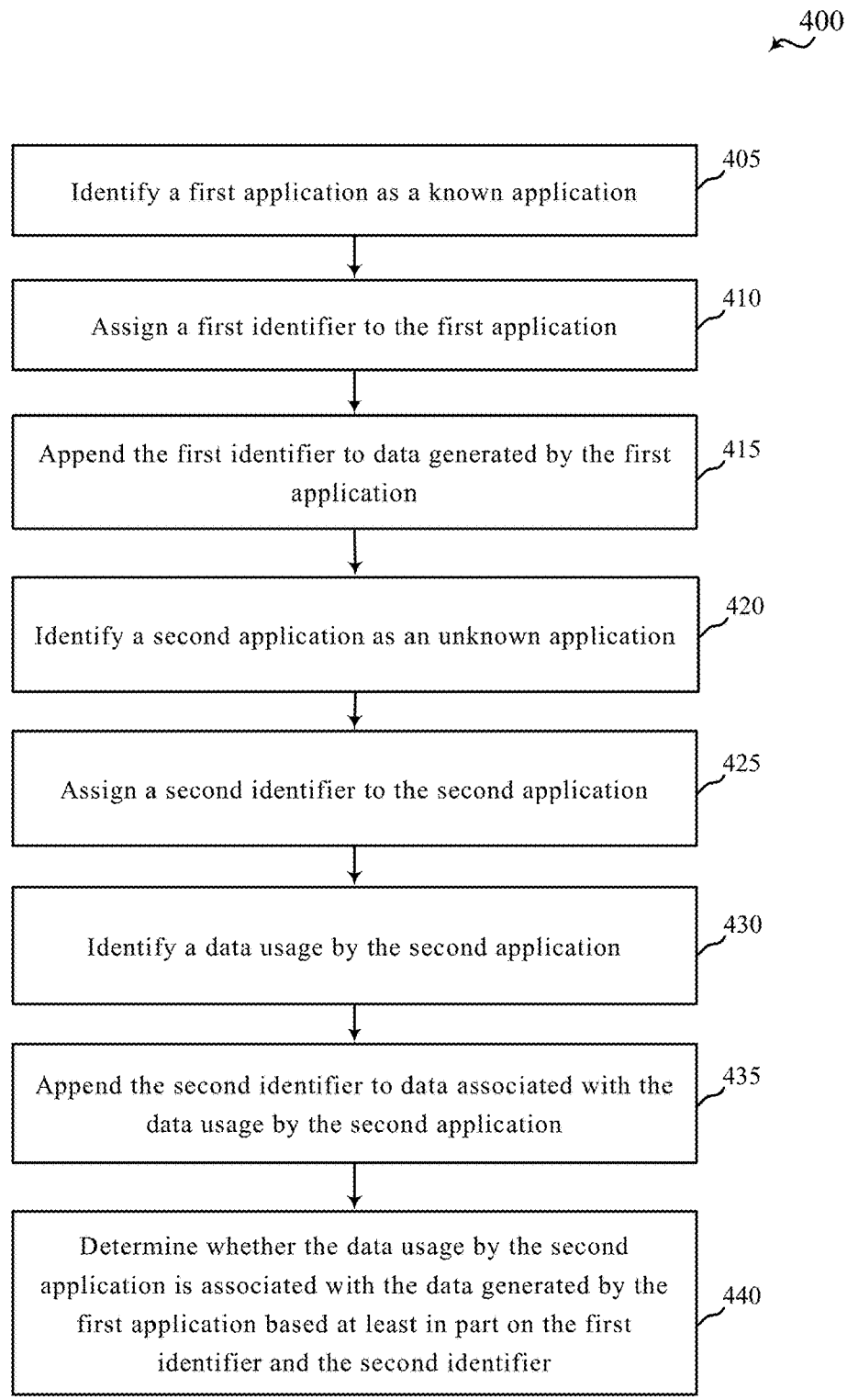
FIG. 4 is a flow diagram illustrating one embodiment of a method for detecting application leaks, in accordance with various aspects of this disclosure.

FIG. 4 is a flow diagram illustrating one embodiment of a method 400 for detecting application leaks. In some configurations, the method 400 may be implemented by the leak detection module 150 illustrated in FIGS. 1 and/or 2. In some configurations, the method 400 may be implemented in conjunction with the first application 140, second application 145, and/or the user interface 135 illustrated in FIG. 1.

At block 405, the method 400 may include identifying a first application as a known application. In some embodiments, the first application may be installed on a device running an ANDROID® operating system. The operation at block 405 may be performed using the leak detection module 150 as described with reference to FIG. 1. In some embodiments, the operation at block 410 may be performed by the identification module 205.

At block 410, the method may include assigning a first identifier to the first application. The operation at block 410 may be performed using the leak detection module 150 as described with reference to FIG. 1. In some embodiments, the operation at block 410 may be performed by the assignment module 210.

At block 415, the method may include appending the first identifier to data generated by the first application. The operation at block 410 may be performed using the leak detection module 150 as described with reference to FIG. 1. In some embodiments, the operation at block 415 may be performed by the assignment module 210.

At block 420, the method may include identifying a second application as an unknown application. In some embodiments, the second application may be installed on a device running an ANDROID® operating system. In some embodiments, the first and second application may be installed on independent devices. For instance, a first application may be installed on device 105 and a second application may be installed on computing device 160 and/or server 110. The operation at block 420 may be performed using the leak detection module 150 as described with reference to FIG. 1. In some embodiments, the operation at block 420 may be performed by the identification module 205.

At block 425, the method may include assigning a second identifier to the second application. The operation at block 425 may be performed using the leak detection module 150 as described with reference to FIG. 1. In some embodiments, the operation at block 425 may be performed by the assignment module 210.

At block 430, the method may include identifying a data usage by the second application. At block 435, the method may include appending the second identifier to data associated with the data usage by the second application. The operation at blocks 430 and 435 may be performed using the leak detection module 150 as described with reference to FIG. 1. In some embodiments, the operation at blocks 430 and 435 may be performed by the identification module 205 and the assignment module 210.

At block 440, the method may include determining whether the data usage by the second application is associated with the data usage by the first application based at least in part on the first identifier and the second identifier. The operation at block 440 may be performed using the leak detection module 150 as described with reference to FIG. 1. In some embodiments, the operation at block 440 may be performed by the determination module 215.

Figure 5:
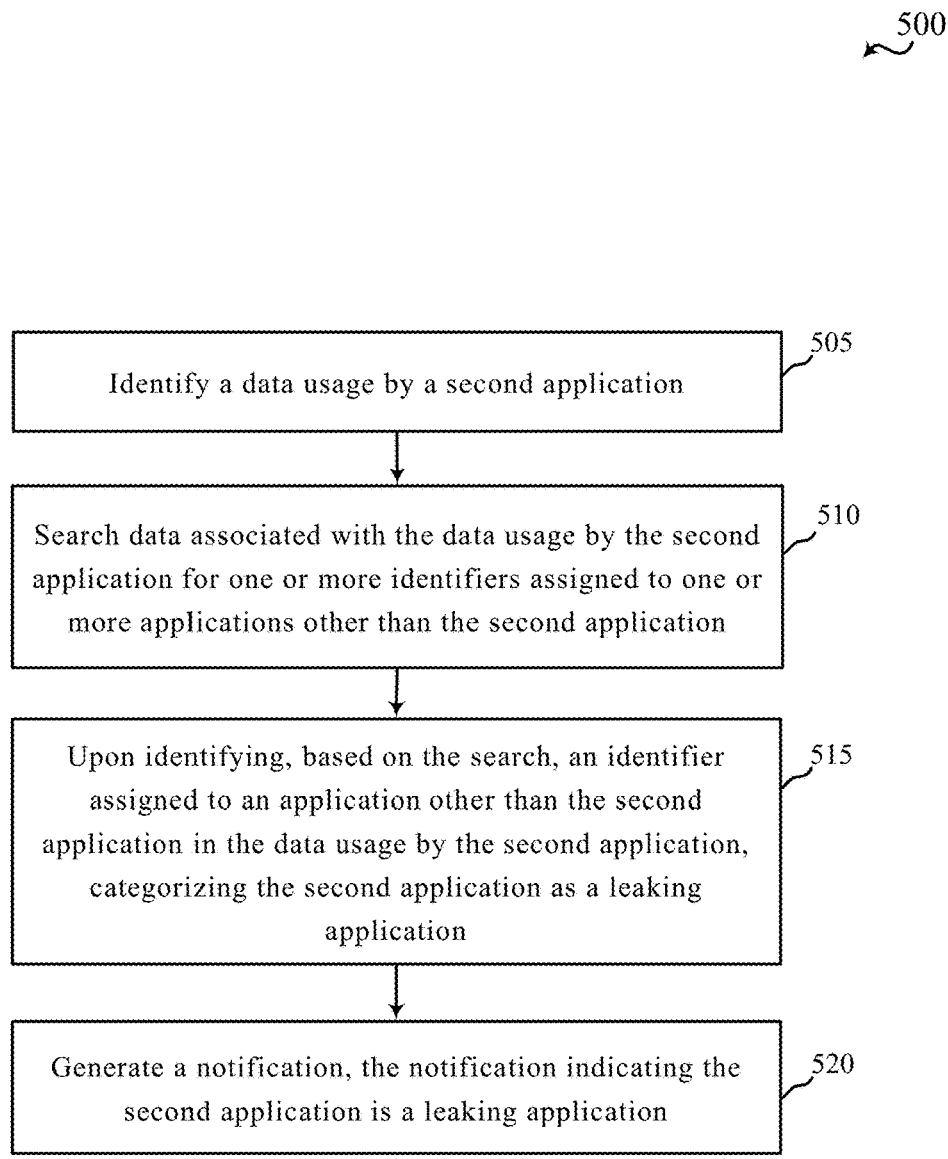
FIG. 5 is a flow diagram illustrating one embodiment of a method for detecting application leaks, in accordance with various aspects of this disclosure.

FIG. 5 is a flow diagram illustrating one embodiment of a method 500 for detecting application leaks. In some configurations, the method 500 may be implemented by the leak detection module 150 illustrated in FIG. 1 or 2. In some configurations, the method 500 may be implemented in conjunction with the first application 140 and/or the user interface 135 illustrated in FIG. 1.

At block 505, the method may include identifying a data usage by a second application as described with reference to FIGS. 3-5. The operation at block 505 may be performed using the leak detection module 150 as described with reference to FIG. 1. In some embodiments, the operation at block 505 may be performed by the identification module 205 and the assignment module 210.

At block 510, the method may include searching data associated with the data usage by the second application for one or more identifiers assigned to one or more applications other than the second application. The operation at block 510 may be performed using the leak detection module 150 as described with reference to FIG. 1. In some embodiments, the operation at block 510 may be performed by the determination module 215.

At block 515, the method may include upon identifying based at least in part on the search, an identifier assigned to an application other than the second application in the data usage by the second application, categorizing the second application as a leaking application. The operation at block 515 may be performed using the leak detection module 150 as described with reference to FIG. 1. In some embodiments, the operation at block 515 may be performed by the identification module 205 in cooperation with the assignment module 210 and determination module 215.

At block 520, the method may include generating a notification. The notification may indicate that the second application is a leaking application. The operation at block 520 may be performed using the leak detection module 150 as described with reference to FIG. 1. In some embodiments, the operation at block 520 may be performed by the notification module 220 in cooperation with determination module 215.

Figure 6:
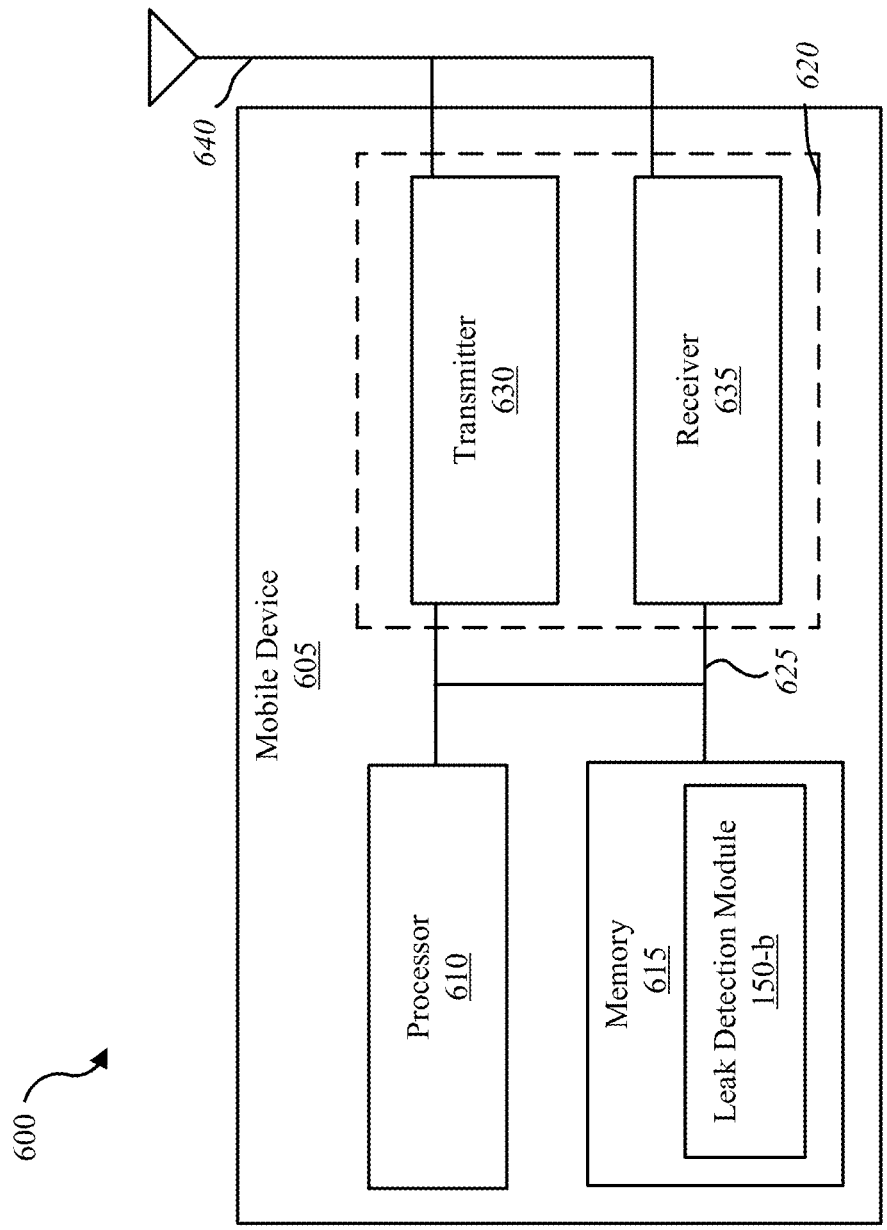
FIG. 6 depicts a block diagram of a computer system suitable for implementing the present techniques, in accordance with various aspects of this disclosure.

FIG. 6 depicts a block diagram of a computer system 600 suitable for implementing the present techniques. In one embodiment, the computer system 600 may include a mobile device 605. The mobile device 605 may be an example of a device 105 depicted in FIG. 1. As depicted, the mobile device 605 may include a bus 625 which interconnects major subsystems of mobile device 605, such as a central processor 610, a system memory 615 (typically RAM, but which may additionally include ROM, flash RAM, or the like), and a transceiver 620 that includes a transmitter 630, a receiver 635, and an antenna 640.

Bus 625 allows data communication between central processor 610 and system memory 615, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the leak detection module 150-*b* to implement the present techniques may be stored within the system memory 615. The leak detection module 150-*b* may be one example of the leak detection module 150 and/or 150-*a* depicted in FIGS. 1 and/or 2. Applications resident with mobile device 605 may be stored on and accessed via a non-transitory computer readable medium, such as a hard disk drive, an optical drive, or other storage medium. Additionally, applications can be in the form of electronic signals modulated in accordance with the application and data communication technology when accessed via a network.

Figure 7:
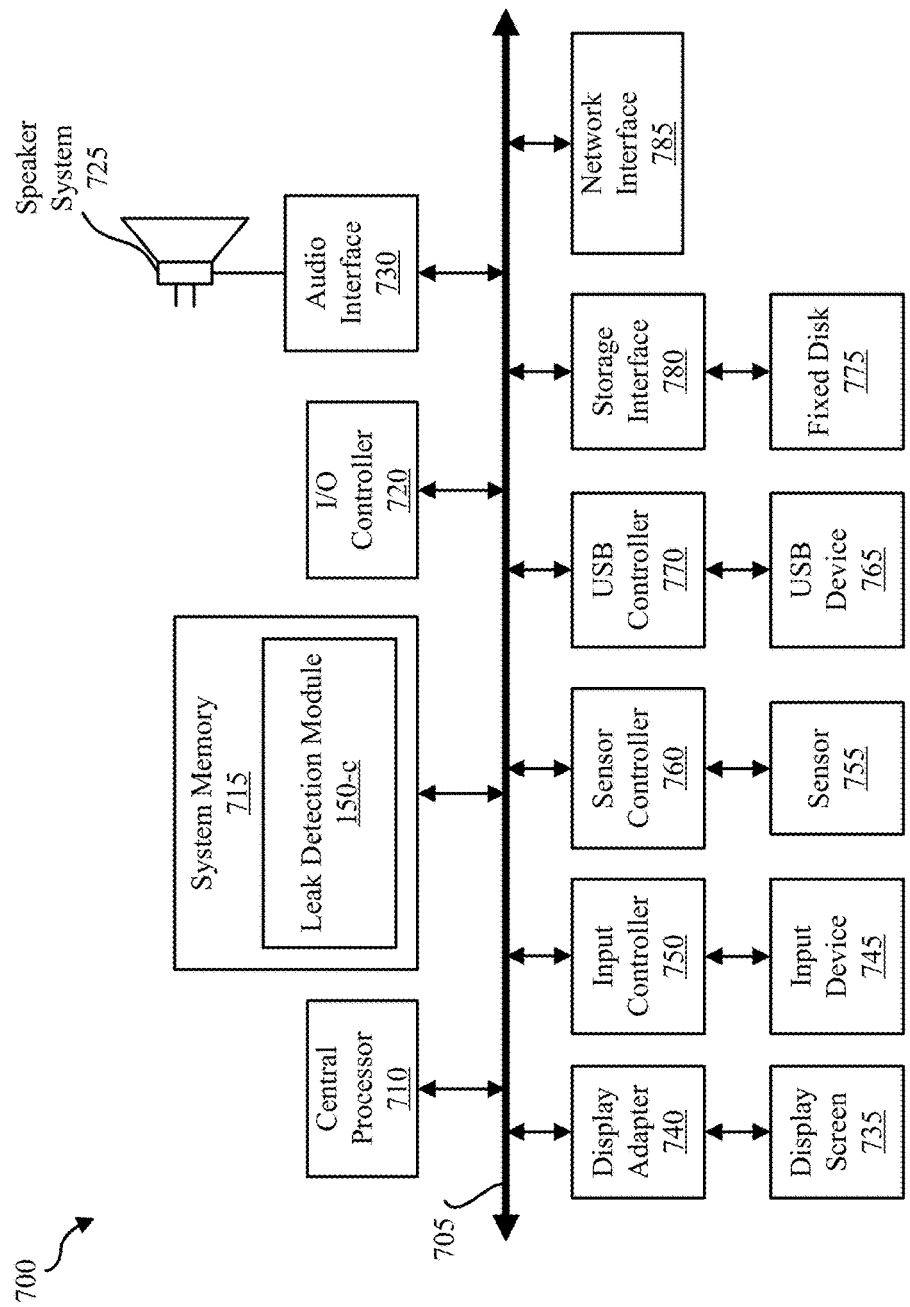
FIG. 7 depicts a block diagram of a computer system suitable for implementing the present techniques, in accordance with various aspects of this disclosure.

FIG. 7 depicts a block diagram of a computing device 700 suitable for implementing the present techniques. The device 700 may be an example of device 105, computing device 160, and/or server 110 illustrated in FIG. 1. In one configuration, device 700 includes a bus 705 which interconnects major subsystems of device 700, such as a central processor 710, a system memory 715 (typically RAM, but which may additionally include ROM, flash RAM, or the like), an input/output controller 720, an external audio device, such as a speaker system 725 via an audio output interface 730, an external device, such as a display screen 735 via display adapter 740, an input device 745 (e.g., remote control device interfaced with an input controller 750), multiple USB devices 765 (interfaced with a USB controller 770), and a storage interface 780. Additionally included are at least one sensor 755 coupled with bus 705 through a sensor controller 760 and a network interface 785 (coupled directly to bus 705).

Bus 705 allows data communication between central processor 710 and system memory 715, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the leak detection module 150-*c* to implement the present techniques may be stored within the system memory 715. The leak detection module 150-*c* may be one example of the leak detection module 150 depicted in FIGS. 1, 2, and/or 6. Applications (e.g., application 140 and/or 145) resident with device 700 are generally stored on and accessed via a non-transitory computer readable medium, such as a hard disk drive (e.g., fixed disk 775) or other storage medium. Additionally, applications can be in the form of electronic signals modulated in accordance with the application and data communication technology when accessed via interface 785.

Storage interface 780, as with the other storage interfaces of device 700, can connect to a standard computer readable medium for storage and/or retrieval of information, such as a fixed disk drive 775. Fixed disk drive 775 may be a part of device 700 or may be separate and accessed through other interface systems. Network interface 785 may provide a direct connection to a remote server via a direct network link to the Internet via a POP (point of presence). Network interface 785 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to device 700 wirelessly via network interface 785.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 7 need not be present to practice the present techniques. The devices and subsystems can be interconnected in different ways from that shown in FIG. 7. The aspect of some operations of a system such as that shown in FIG. 7 are readily known in the art and are not discussed in detail in this application. Code to implement the present disclosure can be stored in a non-transitory computer-readable medium such as one or more of system memory 715 or fixed disk 775. The operating system provided on device 700 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present techniques may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may additionally omit one or more of the steps described or illustrated herein or include additional steps in addition to those disclosed.

Additionally, while various embodiments have been described and/or illustrated herein in the context of fully functional computing systems, one or more of these exemplary embodiments may be distributed as a program product in a variety of forms, regardless of the particular type of non-transitory computer-readable media used to actually carry out the distribution. The embodiments disclosed herein may additionally be implemented using software modules that perform certain tasks. These software modules may include script, batch, or other executable files that may be stored on a non-transitory computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the present techniques and their practical applications, to thereby enable others skilled in the art to best utilize the present techniques and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method for detecting data leaks associated with computer applications, at least a portion of the method being performed by a computing device comprising at least one processor, the method comprising:

identifying a first application running on the computing device as a known application;

assigning a first identifier to the first application;

appending the first identifier to data generated by the first application;

identifying a second application running on the computing device as an unknown application;

assigning a second identifier to the second application;

receiving, from the second application, a request for data;

determining a type of the data based at least in part on the request;
determining that the second application is requesting the data generated by the first application based at least in part on the type of data;
generating incorrect identifiable data associated with the data generated by the first application based at least in part on the second application requesting the data generated by the first application and identifying that the second application is an unknown application;
identifying a data usage of the incorrect identifiable data by the second application;
appending the second identifier to the incorrect identifiable data associated with the data usage by the second application;
detecting data leaks associated with the first application based at least in part on an order of the first identifier and the second identifier appended to the incorrect identifiable data; and
performing a computer security action based at least in part on the detecting of the data leaks.

2. The method of claim 1, wherein the data usage includes at least one of generating data, modifying data, and transmitting data.

3. The method of claim 1, further comprising:
searching the incorrect identifiable data associated with the data usage by the second application for one or more identifiers assigned to one or more applications other than the second application.

4. The method of claim 3, further comprising:
upon identifying, based on the searching, the first identifier in the incorrect identifiable data associated with the data usage by the second application, categorizing the second application as a leaking application.

5. The method of claim 4, wherein performing the computer security action comprises generating a notification indicating the second application is a leaking application.

6. The method of claim 1, further comprising:
identifying, in the incorrect identifiable data associated with the data usage by the second application, two or more identifiers assigned to two or more applications other than the second application.

7. The method of claim 6, further comprising:
generating a leak map based on the identifying the two or more identifiers assigned to the two or more applications other than the second application.

8. The method of claim 7, wherein the leak map includes a flow of the data associated with the data usage by the second application from an originating application to one or more intervening applications and from the one or more intervening applications to the second application, the two or more identifiers being associated with the originating application and the one or more intervening applications, and wherein information related to the leak map is provided in a message to a user of the first application.

9. A computing device configured for detecting data leaks associated with computer applications, comprising:
a processor;
memory in electronic communication with the processor, wherein the memory stores computer executable instructions that when executed by the processor cause the processor to perform the steps of:
identifying a first application running on the computing device as a known application;
assigning a first identifier to the first application;
appending the first identifier to data generated by the first application;
identifying a second application running on the computing device as an unknown application;
assigning a second identifier to the second application;
receiving, from the second application, a request for data;
determining a type of the data based at least in part on the request;
determining that the second application is requesting the data generated by the first application based at least in part on the type of data;
generating incorrect identifiable data associated with the data generated by the first application based at least in part on the second application requesting the data generated by the first application and identifying that the second application is an unknown application;
identifying a data usage of the incorrect identifiable data by the second application;
appending the second identifier to the incorrect identifiable data associated with the data usage by the second application;
detecting data leaks associated with the first application based at least in part on an order of the first identifier and the second identifier appended to the incorrect identifiable data; and
performing a computer security action based at least in part on the detecting of the data leaks.

10. The computing device of claim 9, wherein the data usage includes at least one of generating data, modifying data, and transmitting data.

11. The computing device of claim 9, wherein the instructions executed by the processor cause the processor to perform the steps of:
searching the incorrect identifiable data associated with the data usage by the second application for one or more identifiers assigned to one or more applications other than the second application.

12. The computing device of claim 11, wherein the instructions executed by the processor cause the processor to perform the steps of:
upon identifying, based on the searching, the first identifier in the incorrect identifiable data associated with the data usage by the second application, categorizing the second application as a leaking application.

13. The computing device of claim 12, wherein the computer security action comprises generating a notification indicating the second application is a leaking application.

14. The computing device of claim 9, wherein the instructions executed by the processor cause the processor to perform the steps of:
identifying, in the incorrect identifiable data associated with the data usage by the second application, two or more identifiers assigned to two or more applications other than the second application.

15. The computing device of claim 14, wherein the instructions executed by the processor cause the processor to perform the steps of:
generating a leak map based on the identifying the two or more identifiers assigned to the two or more applications other than the second application.

16. The computing device of claim 15, wherein the leak map includes a flow of the data associated with the data usage by the second application from an originating application to one or more intervening applications and from the one or more intervening applications to the second application, the two or more identifiers being associated with the originating application and the one or more intervening applications, and wherein information related to the leak map is provided in a message to a user of the first application.

17. A non-transitory computer-readable storage medium storing computer executable instructions that when executed by a processor cause the processor to perform the steps of:
identifying a first application running on a computing device as a known application;
assigning a first identifier to the first application;
appending the first identifier to data generated by the first application;
identifying a second application running on the computing device as an unknown application;
assigning a second identifier to the second application;
receiving, from the second application, a request for data;
determining a type of the data based at least in part on the request;
determining that the second application is requesting the data generated by the first application based at least in part on the type of data;
generating incorrect identifiable data associated with the data generated by the first application based at least in part on the second application requesting the data generated by the first application and identifying that the second application is an unknown application;
identifying a data usage of the incorrect identifiable data by the second application;
appending the second identifier to the incorrect identifiable data associated with the data usage by the second application;
detecting data leaks associated with the first application based at least in part on an order of the first identifier and the second identifier appended to the incorrect identifiable data; and
performing a computer security action based at least in part on the detecting of the data leaks.

18. The computer-readable storage medium of claim 17, wherein the data usage includes at least one of generating data, modifying data, and transmitting data.

19. The computer-readable storage medium of claim 17, wherein the instructions executed by the processor cause the processor to perform the steps of:
searching the incorrect identifiable data associated with the data usage by the second application for one or more identifiers assigned to one or more applications other than the second application.

20. The computer-readable storage medium of claim 19, wherein the instructions executed by the processor cause the processor to perform the steps of:
upon identifying, based on the searching, the first identifier in the incorrect identifiable data associated with the data usage by the second application, categorizing the second application as a leaking application.

\* \* \* \* \*